(12) United States Patent
Farrell et al.

(10) Patent No.: US 6,467,559 B1
(45) Date of Patent: Oct. 22, 2002

(54) PROPULSION DEVICE AND METHOD OF USE

(75) Inventors: Mark Farrell, Georgetown (CA); Hans J. Fischer, Georgetown (CA)

(73) Assignee: Motoroller Propulsion Company, Inc., Georgetown (CA)

( * ) Notice: Subject to any disclaimer, the term of this patent is extended or adjusted under 35 U.S.C. 154(b) by 0 days.

(21) Appl. No.: 09/498,579

(22) Filed: Feb. 4, 2000

Related U.S. Application Data

(60) Provisional application No. 60/118,855, filed on Feb. 5, 1999.

(51) Int. Cl.[7] ............................................. A63C 17/12
(52) U.S. Cl. ...................... 180/180; 180/186; 280/826
(58) Field of Search ................................ 180/180, 181, 180/191, 19.1, 19.2, 19.3; 280/826

(56) References Cited

U.S. PATENT DOCUMENTS

| | | | | |
|---|---|---|---|---|
| 2,456,440 A | * | 12/1948 | Morrill | 180/313 |
| 2,509,603 A | * | 5/1950 | Marin | 180/313 |
| 3,750,777 A | * | 8/1973 | Thompson | 180/180 |
| 3,797,446 A | | 3/1974 | Cox et al. | 115/6.1 |
| 3,812,813 A | * | 5/1974 | Dickson | 440/71 |
| 3,826,323 A | | 7/1974 | Mehne | 180/5 |
| 4,096,919 A | * | 6/1978 | Thompson | 180/180 |
| 4,175,627 A | | 11/1979 | Husted | 180/190 |
| 4,189,019 A | | 2/1980 | Zech | 180/192 |
| 4,260,036 A | | 4/1981 | Bissett | 180/182 |
| 4,508,187 A | | 4/1985 | Wenzel | 180/181 |
| 4,519,470 A | | 5/1985 | Allisio | 180/180 |
| 4,893,577 A | * | 1/1990 | Jennings | 114/253 |
| 5,222,569 A | | 6/1993 | Martel | 180/180 |
| 5,492,345 A | | 2/1996 | Kruczek | 280/11.115 |
| D372,000 S | | 7/1996 | Searles | D12/1 |
| 5,562,176 A | * | 10/1996 | Luccernoni et al. | 180/180 |
| 5,735,361 A | * | 4/1998 | Forrest | 180/6.24 |
| 5,927,420 A | * | 7/1999 | Karrington | 180/181 |
| 6,139,033 A | * | 10/2000 | Western | 280/47.23 |

FOREIGN PATENT DOCUMENTS

| | | | |
|---|---|---|---|
| EP | 0 572 880 A1 | 5/1993 | ........... B62D/63/02 |
| GB | 2 068 752 A | 1/1980 | |

* cited by examiner

*Primary Examiner*—Robert P. Olszewski
*Assistant Examiner*—James S. McClellan
(74) *Attorney, Agent, or Firm*—Locke Liddell & Sapp LLP

(57) ABSTRACT

The present invention generally relates to a propulsion device and method of use of the propulsion device that propels at least one user equipped with at least one friction-reducing device. The propulsion device typically comprises a motor, a drive train, and a traction device attached or incorporated into a frame. At least one user is secured to the device by straps that engage the user at a waist level or shoulder level interface. The user may direct the propulsion device by acting upon the handlebars that are adjustably attached to the frame of the propulsion device. Moreover, multiple users using multiple propulsion devices can engage in social group or competitive activities. The propulsion device offers the versatility of being able to traverse numerous forms of terrain while using a variety of friction-reducing devices.

9 Claims, 18 Drawing Sheets

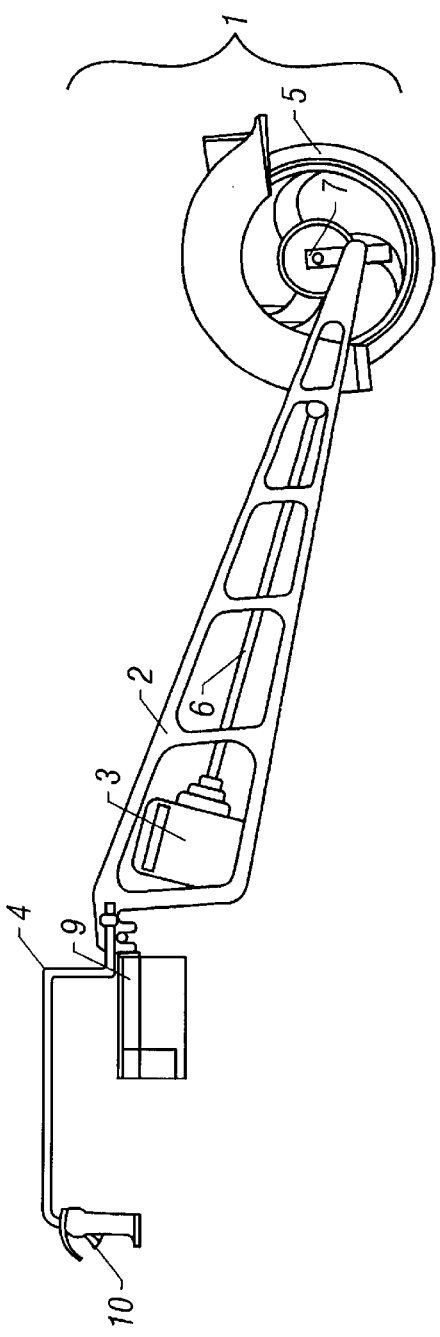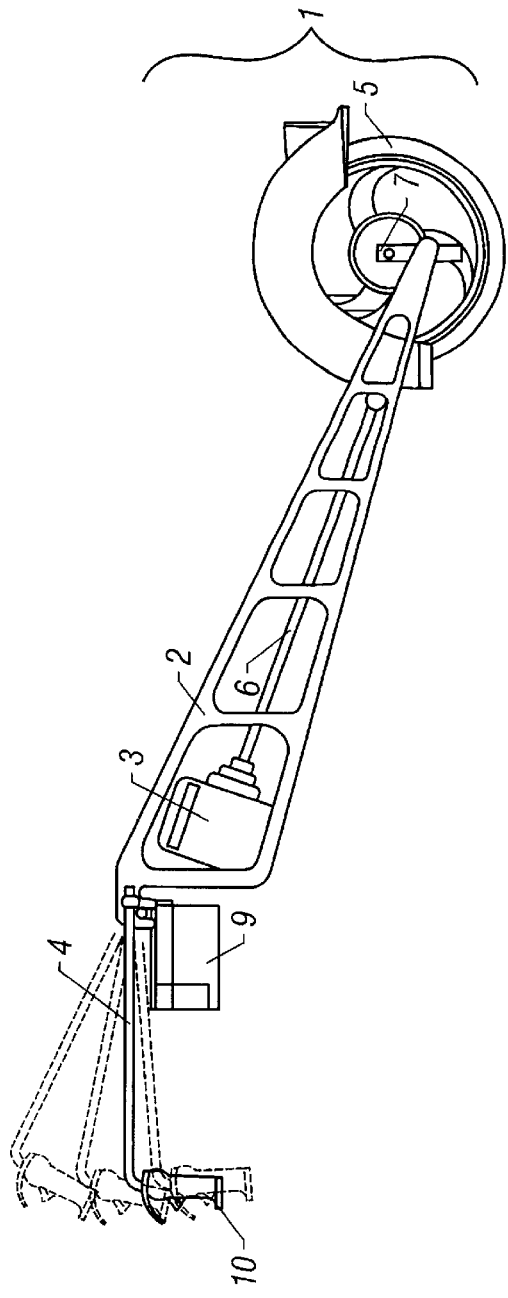

PROPULSION DEVICE AND METHOD OF USE

This application claims benefit of provisional application No. 60/118,855 filed Feb. 5, 1999.

FIELD OF THE INVENTION

The present invention discloses a device and method of use of this device to displace at least one person and more particularly to propel at least one person using skates, skis, wheels, or similar friction reducing means over a variety of terrains.

BACKGROUND OF THE INVENTION

The prior art discloses several different devices to aid in the displacement of a person when used in conjunction with friction reducing devices such as skis, skates, or wheels. For example, U.S. Pat. No. 4,508,187 (Wenzel) discloses a motorized roller skate apparatus wherein the motor is secured to the back of the user wherein the device comprises a flexible drive leading from the motor to the front wheel truck of a roller skate. Though this device was an improvement over the prior art, see, e.g., U.S. Pat. No. 2,857,008 (Pirrello), this configuration provides limited versatility in only providing propulsion to conventional roller skates. Additionally, this device is limited to providing power to the small front wheel truck of the device. Moreover, this device is not prepared to encounter the varied environments that a user may wish to enjoy. Finally, the creation of thrust on the lowest point of the user can create a balancing problem.

Fan propulsion units have offered another approach. For example, U.S. Pat. No. 4,189,019 (Zech) discloses a backpack style propulsion unit with a variable thrust means. By employing an internal combustion engine integrated with a fan, the device is capable of generating a thrusting force to deploy a user who is utilizing a friction reducing means. Offering an improvement, U.S. Pat. No. 5,222,569 (Martel) discloses a backpack fan assembly that lowers the thrusting point to aid in stability. Unfortunately, even Martel cannot overcome some of the problems with this design. First, the user is burdened with bearing the full weight of either device. This increase in weight effectively increases the burden on the friction reducing devices being used. Additionally, these devices offer less stability than the present invention because slight adjustments in posture or a shifting of the user's weight can substantially alter the thrusting direction and the line of travel, consequently. Finally, the exclusive use of a fan to propel the user reduces the power and speed that the user may enjoy. As a result, these devices are more limited in providing effective propulsion in less than optimal environments.

Analogously, a few devices have implemented a rear-mounted device to provide propulsion. For example, U.S. Pat. No. 4,175,627 (Husted) discloses a propulsion system for a snow going device comprising a tread having a roller chain carrying cleats to provide traction in the snow. This device suffers from requiring the user to remain in a seated position. Additionally, Husted only envisions use in a snow environment and is not suitable for other terrain. Moreover, this configuration does not provide for the requisite clearance needed to overcome obstacles. Demonstrating another rear propelled device configuration, U.S. Pat. No. 3,826,323 (Mehne) and U.S. Pat. No. 4,519,470 (Allisio) disclose devices that can be used to propel a skier up modest inclines and slopes. The mechanized means of an endless track provides a limited method to traverse snow and does not provide a solution to overcome the variety of terrain that a user may want to explore. Additionally, these endless track devices or the wheeled skis offer less utility when used in conjunction with skates or similar friction reducing means. Finally, U.S. Pat. No. Design 372,000 (Searles) discloses a motorized pushing device that comprises a single tire. Though this device provides for a user that is wearing skates, Searles requires that the thrust of the device push against the hands of the user. Therefore, even Searles fails to provide an adequate and efficient method of providing the force generated by the motorized pushing device over more than a minimal portion of the body of the user.

SUMMARY OF THE INVENTION

The present invention overcomes the shortcomings of the prior art by offering a versatile and efficient propulsion device that may be used in a variety of terrain and with skates, skis, or similar friction reducing means. Though the preferred embodiment can propel at least one user across a variety of surfaces ranging from ice to snow or from mud to moderately rocky terrain, the device is easily adapted to provide propulsion in water. The device comprises a frame that secures the user by either attaching about at least one user's waist or offering the alternative securing means of a back pack harness that engages at least one user at the shoulder level. The frame provides a fixation point for a motor that is either directly connected or connected via a drive train to a rotatable traction device capable of negotiating the medium of the terrain. This device can safely propel each user over a variety of terrains while offering better power and versatility.

BRIEF DESCRIPTION OF THE DRAWINGS

FIG. 1 shows a side view of an embodiment of the present invention utilizing a waist mount to secure the device to the user.

FIG. 2 shows a side view of an embodiment of the invention that utilizes a backpack shoulder mount to secure the user to the invention.

DETAILED DESCRIPTION OF PREFERRED EMBODIMENTS

Figure 3:
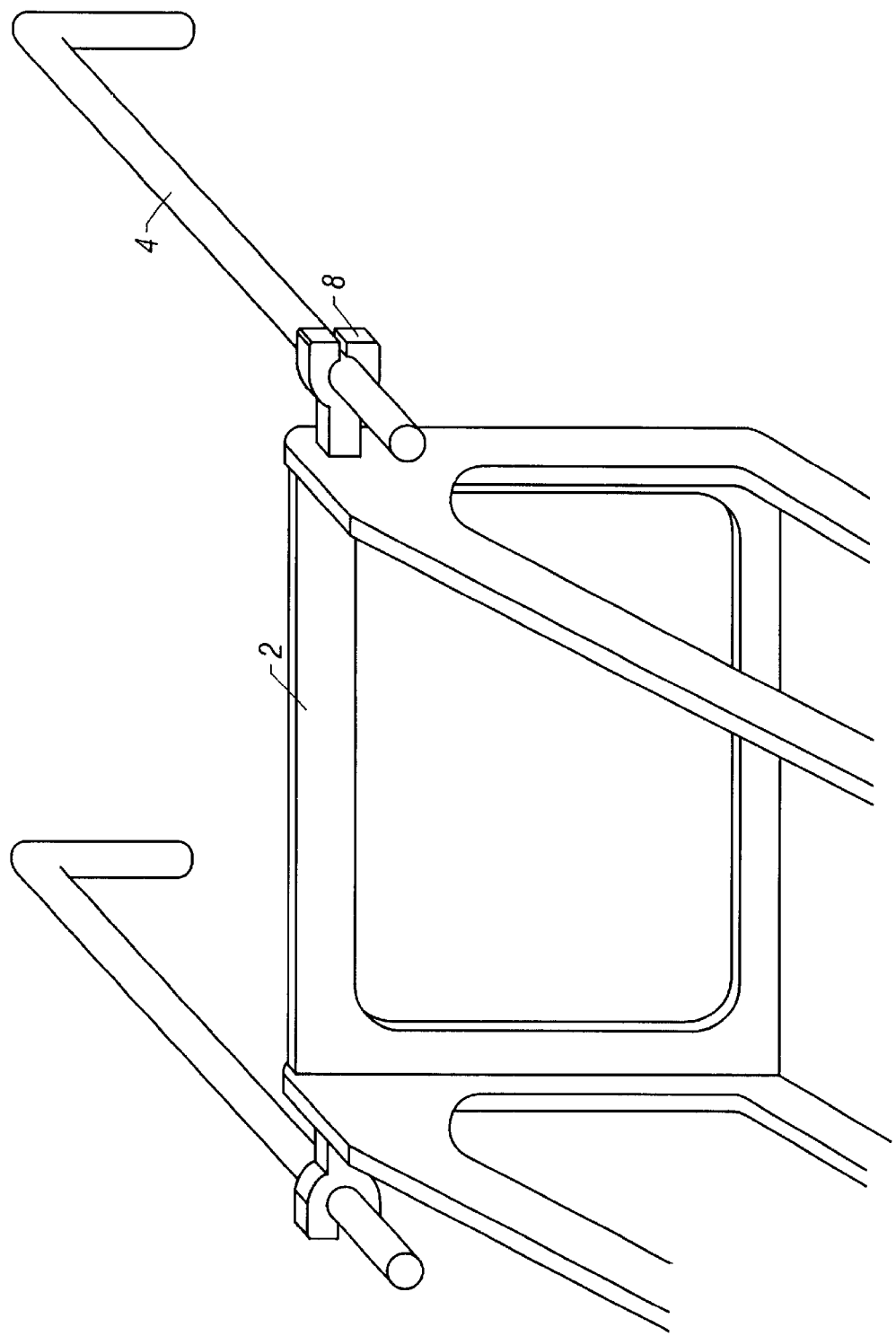
FIG. 3 shows a perspective view of one embodiment of the handlebars of the device.

Though the device can be adapted in numerous configurations, FIG. 1 demonstrates one preferred embodiment of the invention. As shown, a propulsion device 1 comprises a frame 2, a motor 3, a handle bar assembly 4, and a traction device 5. The frame 2 may be made of metal, preferably a lighter metal such as aluminum, a composite, a plastic, or another structurally strong material. The frame 2 may be formed by conventional molding, injection molding, rotomolding, draw stamping process, or another other method evident to those skilled in the art. The frame 2 not only connects the traction device 5 and the handlebar assembly 4, but also provides a location for the motor 3.

The motor 3 may be electric, gasoline, internal combustion, two stroke, four stroke, turbo jet, or alternative fuel driven, including but not limited to propane, methane, natural gas, or fuel cell. The propulsion device 1 may further comprise any fuel, and an appropriate container for this fuel, that the motor needs to properly function. In a preferred embodiment, the motor 3 comprises an internal combustion motor like the motor typically found in a bush trimmer, a lawn mower, or an outboard motor of small boat. In the preferred embodiment, the controls on the handle bar 4 can allow the user to stop the propulsion device 1 and/or activate, fluctuate, and terminate the gas/air mixture from a carburetor, thus choking the motor in a manner known to those skilled in the art.

In an alternative embodiment of the invention, the motor 3 and/or the drive train 6 can be adapted to actuate a variety of devices that the user may need at his or her destination. For example, the motor 3 could be connected to an auger to drill a hole in ice for fishing if the user has chosen to the use the propulsion device 1 to travel to a favorite ice fishing spot. Additionally, the user may want to connect the motor 3 to a pump or fan once he or she has reached a destination. Finally, the motor 3 could be adapted to provide power to a boat propeller when used to complement the present invention.

This motor 3 powers a drive train 6, shown as a drive shaft in FIG. 1, capable of causing the traction device 5 to rotate. The drive train 6 may comprise a sprocket and chain driven, friction pulley driven, hub driven, direct driven, belt driven, or similar means known to those skilled in the art. The actuation of the drive train 6 by the motor 3 causes the traction device 5 to rotate about a longitudinal axis 7 of the traction device 5 such that an outermost rim of the traction device 5 contacts the terrain and creates a traction that propels the propulsion device 1 and its user forward.

The traction device 5 may comprise at least one tire, wheel, hubbed wheel, impeller, paddle, fan, continuous tread, or similar gripping device. Additionally, in the embodiment that the traction device 5 comprises at least one tire, each tire may further comprise a spiked or studded outer rim to provide additional traction for snowy, icy, muddy, or similar unconsolidated terrain. In an embodiment that the traction device 5 comprises at least one fan, the traction device 5 may comprise a corresponding number of fan cages to provide additional safety and comply with all applicable safety standards and laws. Finally, in an embodiment wherein the propulsion means 1 is being used to traverse unconsolidated or liquid laden terrain, including water, the propulsion device 1 may further comprise a buoyancy system capable of providing the requisite buoyancy to traverse the swamp, marsh, body of water, or similar unconsolidated or liquid containing terrain.

The propulsion device 1 further comprises at least one strap 9 or similar engagement means that may engage the user at either the user's waist or in a backpack configuration that can be secured to the user's shoulders. These configurations are shown in FIGS. 1–2, FIGS. 8–12, and FIG. 17 show the propulsion device 1 with the straps 9 or similar engagement means secured to the user. In addition, the propulsion device 1 further comprises a plurality of handle bars 4, having a corresponding plurality of grips 10, that are comprised of one inch metal tubing in the preferred embodiment, but any material capable of providing the necessary support and protection known to those skilled in the art will suffice. Both FIG. 1 and FIG. 2 illustrate the straps 4 as attached to the frame 2 that may be disposed about or connected to the user to provide security during operation of the propulsion device 1.

Typically, the strap 9 either directly or indirectly attaches to the frame 2 by a conventional method known to those skilled in the art. However, the fixation of the straps 4 to the propulsion device 1 provides vertical support for the propulsion device 1 when it is attached to the user, but does not hinder the equilibrium or manageability of the propulsion device 1 during operation.

Additionally, the disengagement of the user from the propulsion device can effectuate a shut down of the propulsion device 1 for safety reasons. Though many methods will be evident to those skilled in the art, the preferred embodiment may comprise a kill-switch arrangement that will terminate the propulsion device 1 if the user is dislocated during operation. Any additional safety measures or devices that are evident to those skilled in the art, dictated by custom or law, or would be prudent are encouraged to used with the present invention.

As shown in FIG. 3, each handle bar 4 is adjustable to provide for the varying proportions of each user. This adjustment allows the user to personalize the propulsion device 1. In the preferred embodiment, the frame 2 further comprises a plurality of forked couplings 8 that capture and secure each handle bar 4. This arrangement allows the user to rotate or translate the handlebars 4 as needed to provide comfort and safety during the operation of the propulsion device 1. Additionally, either handle bar can provide a location for the controls that manipulate the motor and ultimately alter the present disposition of the propulsion device 1. In the preferred embodiment, the handle bar 4 provides a location for a throttle, a brake actuator, and safety kill-switch.

Figure 4:
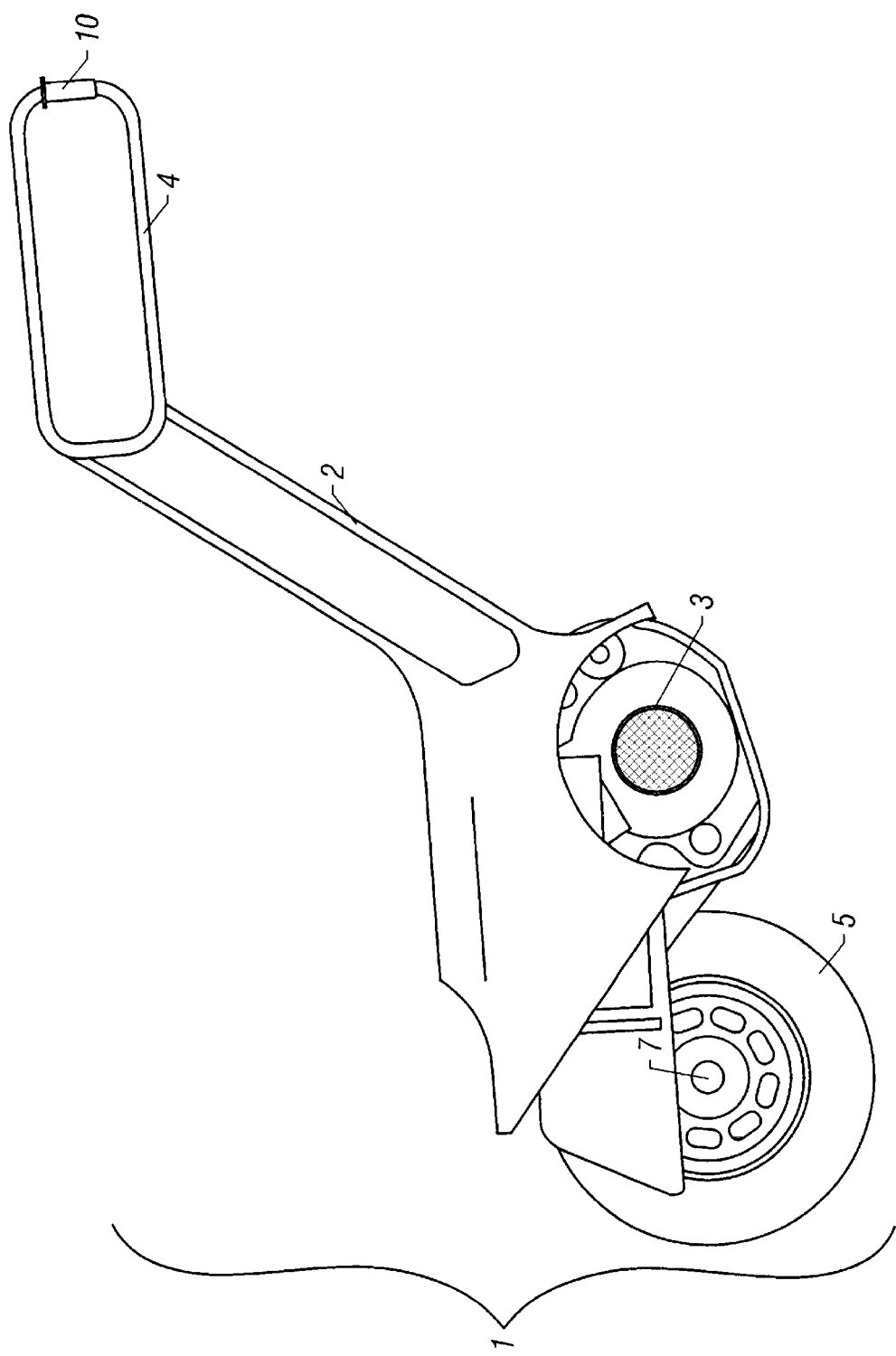
FIG. 4 shows a side view of an alternate embodiment of the invention.
Figure 5:
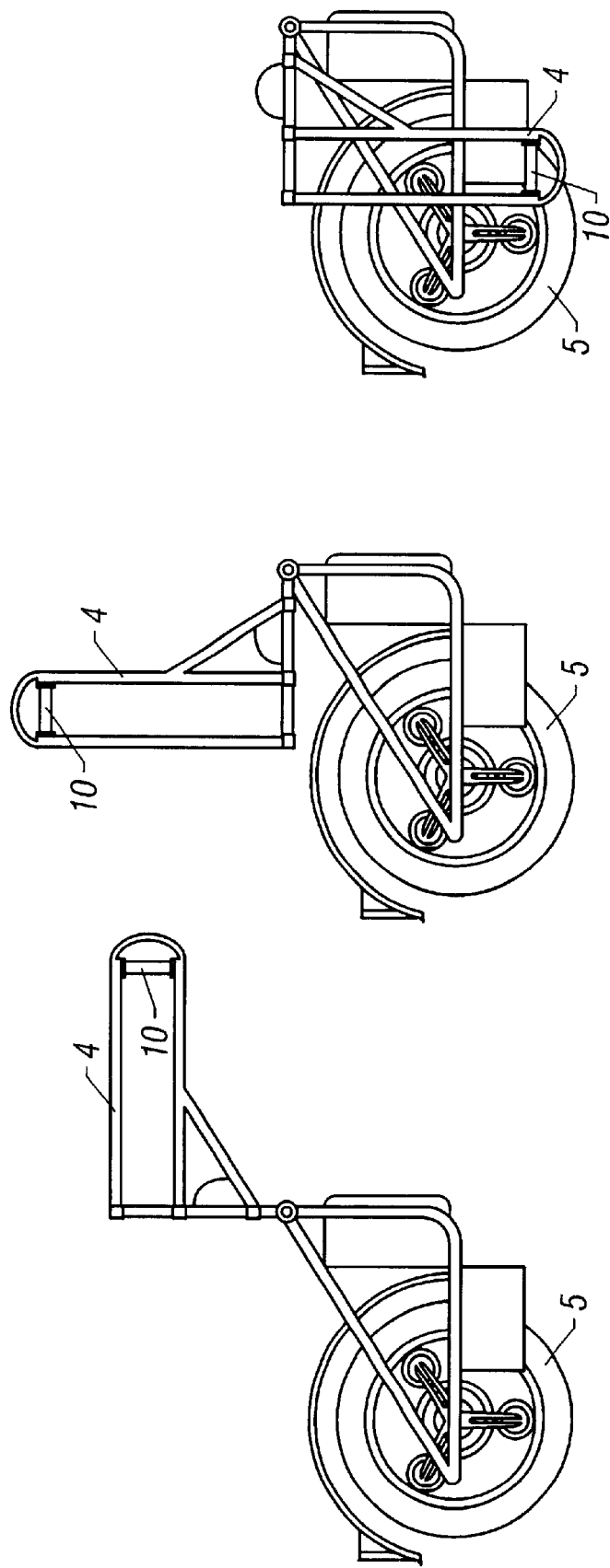
FIG. 5 shows a plurality of side views of an embodiment of the invention that demonstrates the portability of the invention.

As shown in FIG. 4, various alternatives are offered for the placement of the motor 3 on the frame 2. In this configuration, the propulsion device 1 demonstrates that the motor 3 can be situated at a lower position in relation to the user. This configuration offers a lower center of gravity for the propulsion device 1 and thus increases stability. Alternatively, the propulsion device 1 can be constructed as shown in FIG. 5 to be collapsible and thus easier to store and carry between uses.

Figure 6:
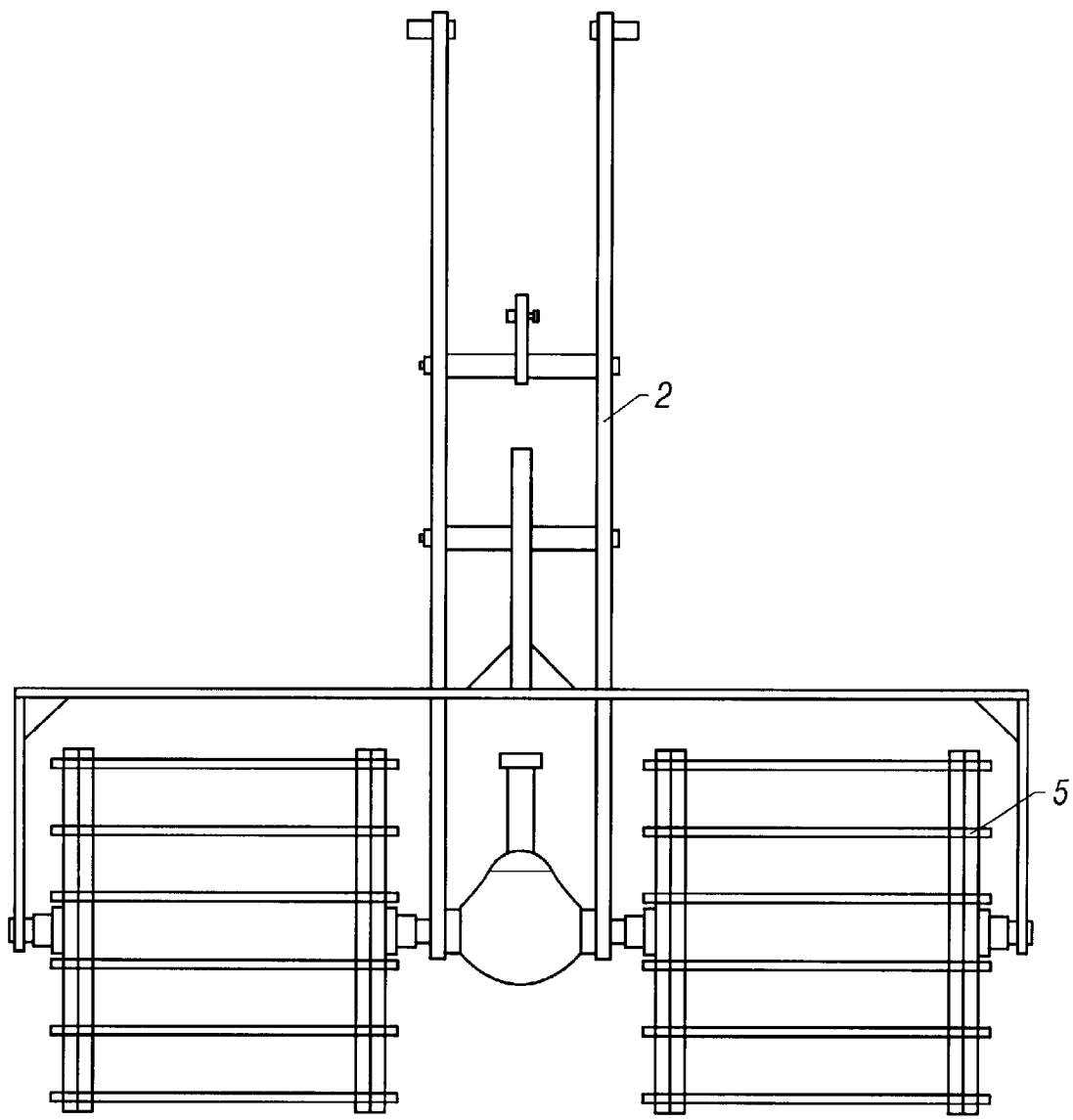
FIG. 6 shows a front view of an embodiment of the invention that demonstrates the adaptability for snow or water conditions.
Figure 7:
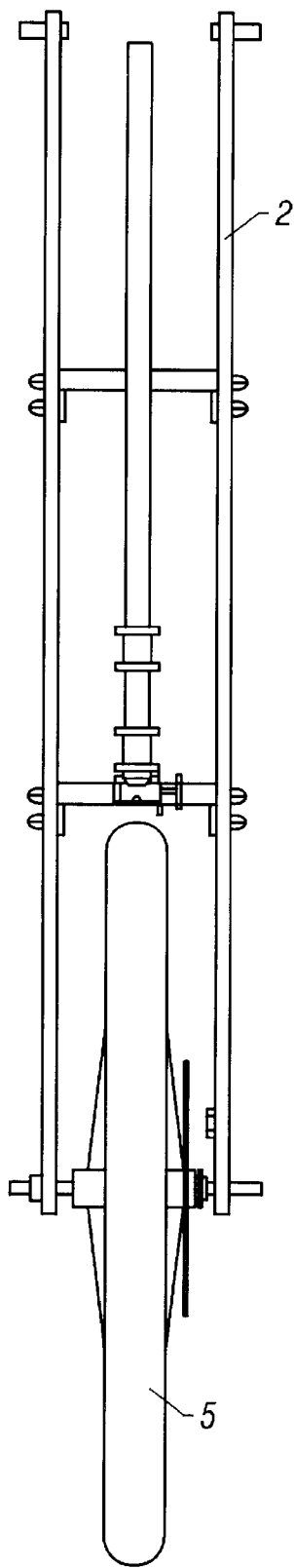
FIG. 7 shows a front view of an embodiment of the lower portion of the invention.
Figure 8:
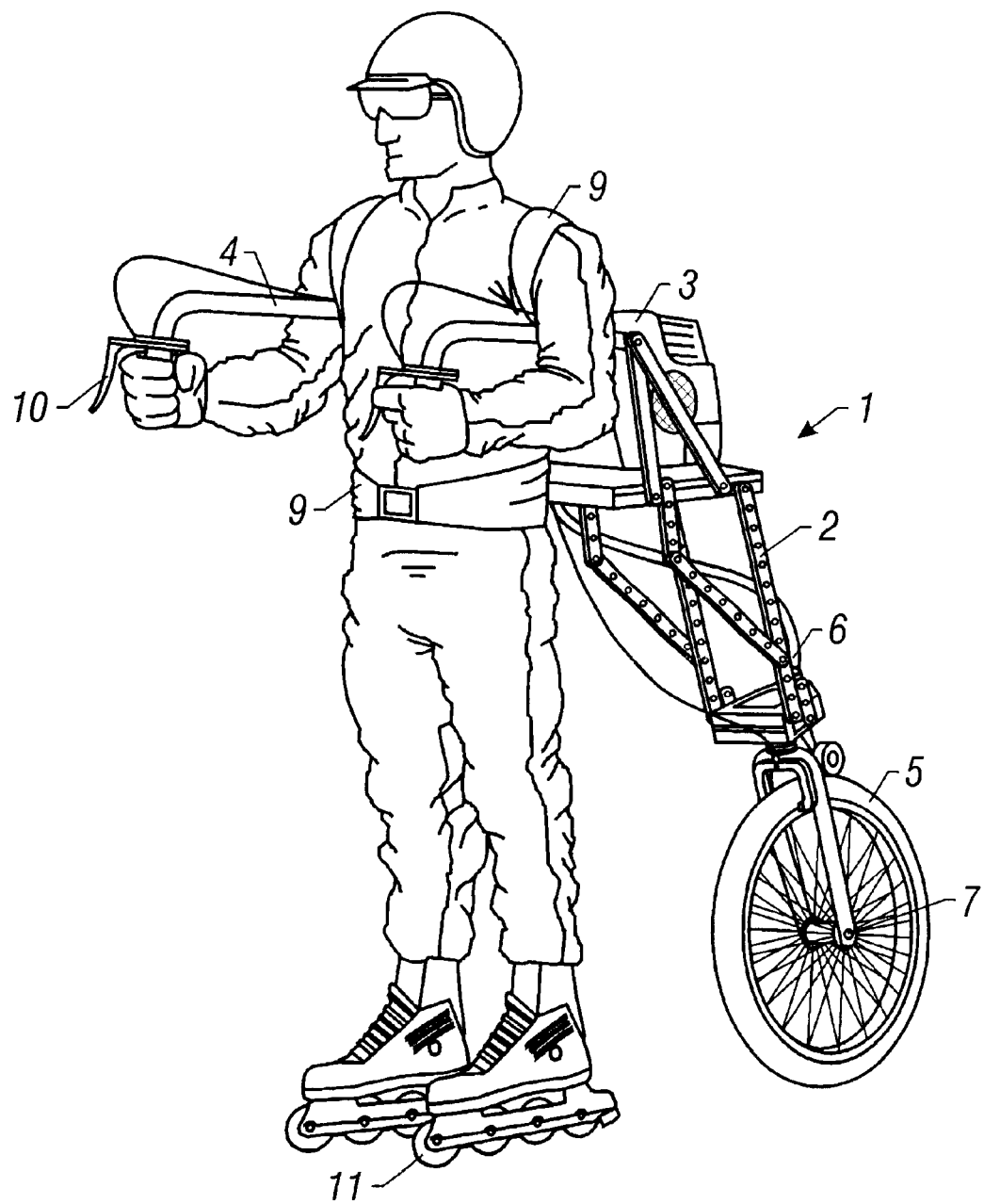
FIG. 8 shows a perspective view of a user using an alternative embodiment of the invention.
Figure 9:
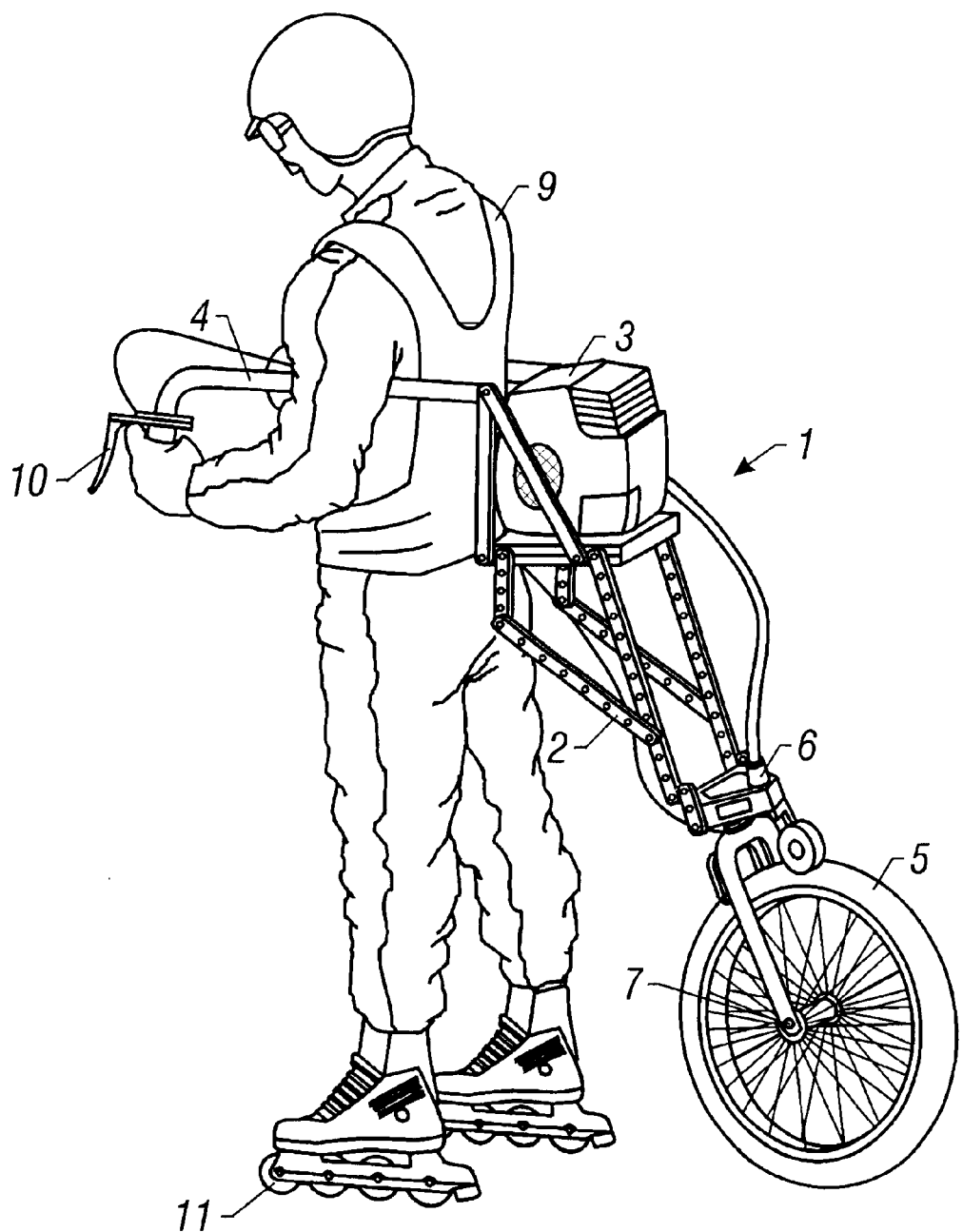
FIG. 9 shows a perspective view of an alternative embodiment of the invention.
Figure 10:
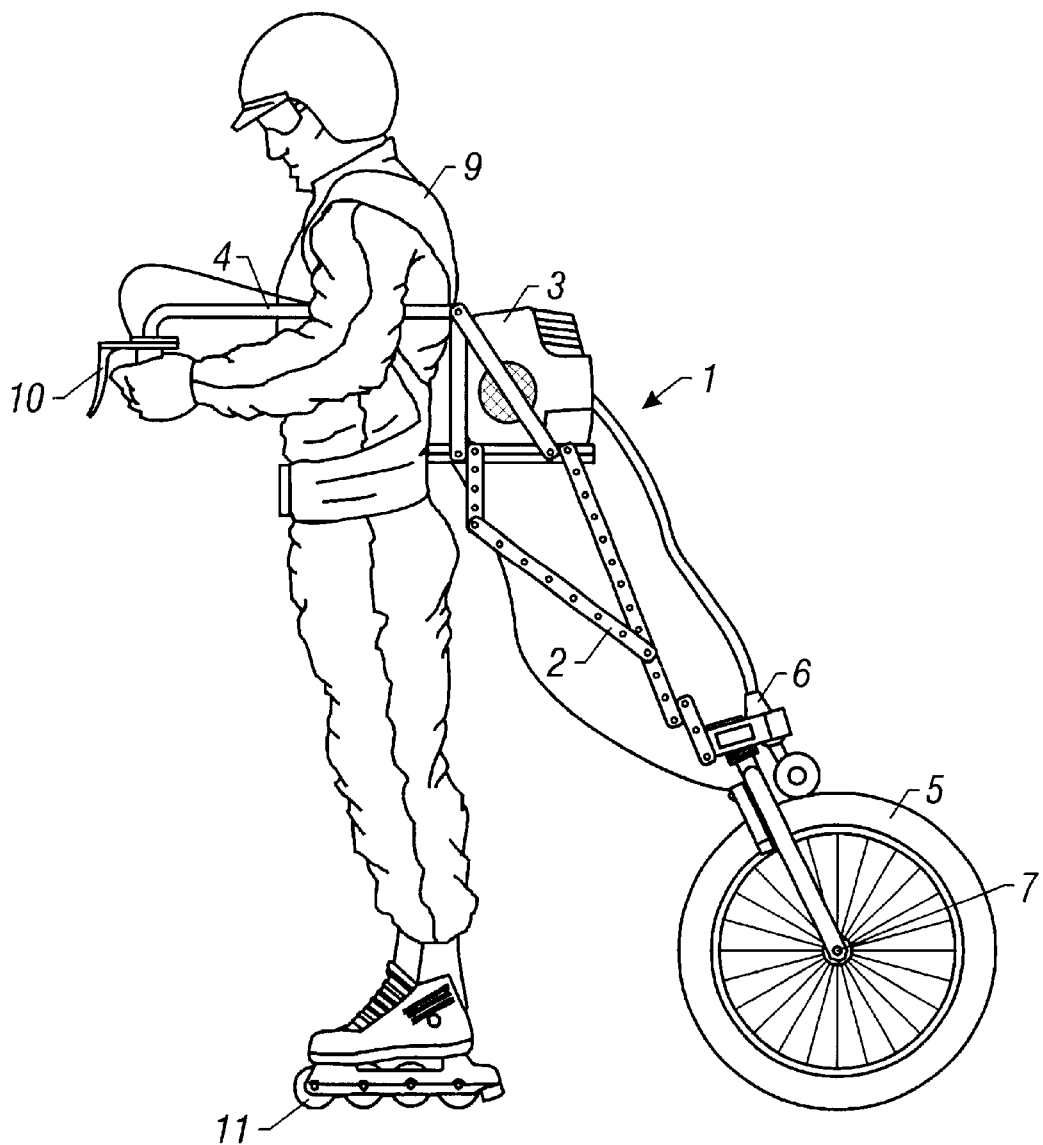
FIG. 10 shows a side view of an alternative embodiment of the invention.
Figure 11:
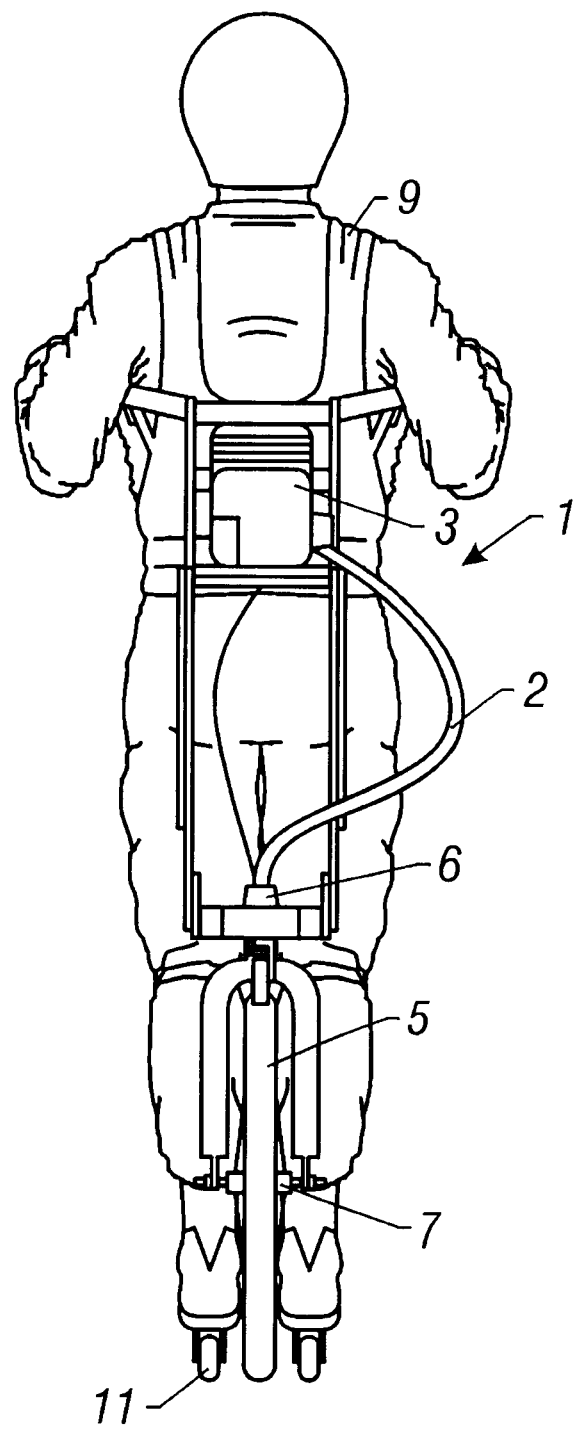
FIG. 11 shows a rear view of an alternative embodiment of the invention.

The drawings in FIGS. 6 and 7 illustrate a more detailed front view of a lower assembly of the propulsion device 1. This lower portion of the propulsion device 1 may comprise a wheel as shown in FIG. 7 or an alternative structure for the traction device 5 as shown in FIG. 6. Additionally, FIG. 6 demonstrates that a plurality of traction devices 5 can provide additional traction and greater stability.

Moreover, as shown in FIGS. 8–12 and FIG. 17, the propulsion device 1 is intended to be used in conjunction with a user who is equipped with at least one friction reducing device 11 interacting to contend with the. user's interface with the terrain. Each friction reducing device 11 may comprise a snow ski, a water ski, an in line skate, a hockey skate, an ice skate, a roller skate, a skate board, a pontoon, a bicycle, an unicycle, a tricycle, a wheel, a bearing, or a similar gliding or rolling means. Each friction-reducing device 11 cooperates with the propulsion device 1 to propel the user.

Furthermore, a plurality of users using a corresponding plurality of propulsion devices 1 can enjoy the present invention for group travels or engage in competitive racing. With respect to racing, users could compete in speed, endurance, distance, derby, and/or team events. Using the propulsion devices 1, competitors can compete across any terrain described herein using propulsion devices 1 equipped in any configuration described herein. In a preferred method of using multiples of the present invention, multiple users can engage in racing activities similar to those enjoyed with virtually any motorized vehicles such as motorcycles, snowmobiles, or jet skis. Furthermore, in a preferred method of multiple use, competitors using the propulsion devices 1 could race about tracks of virtually any shape.

Figure 12:
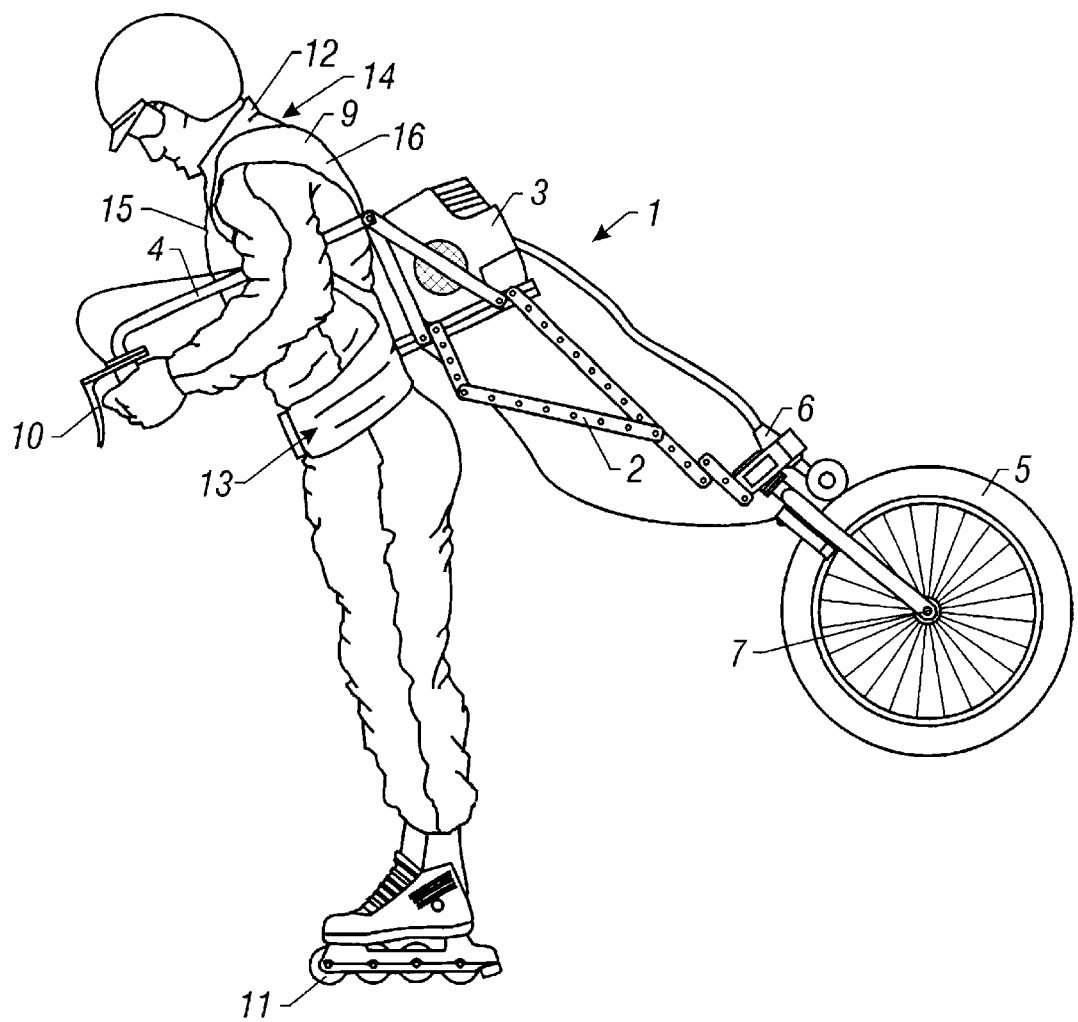
FIG. 12 shows a side view of an alternative embodiment of the invention demonstrating the portability of the invention.
Figure 13:
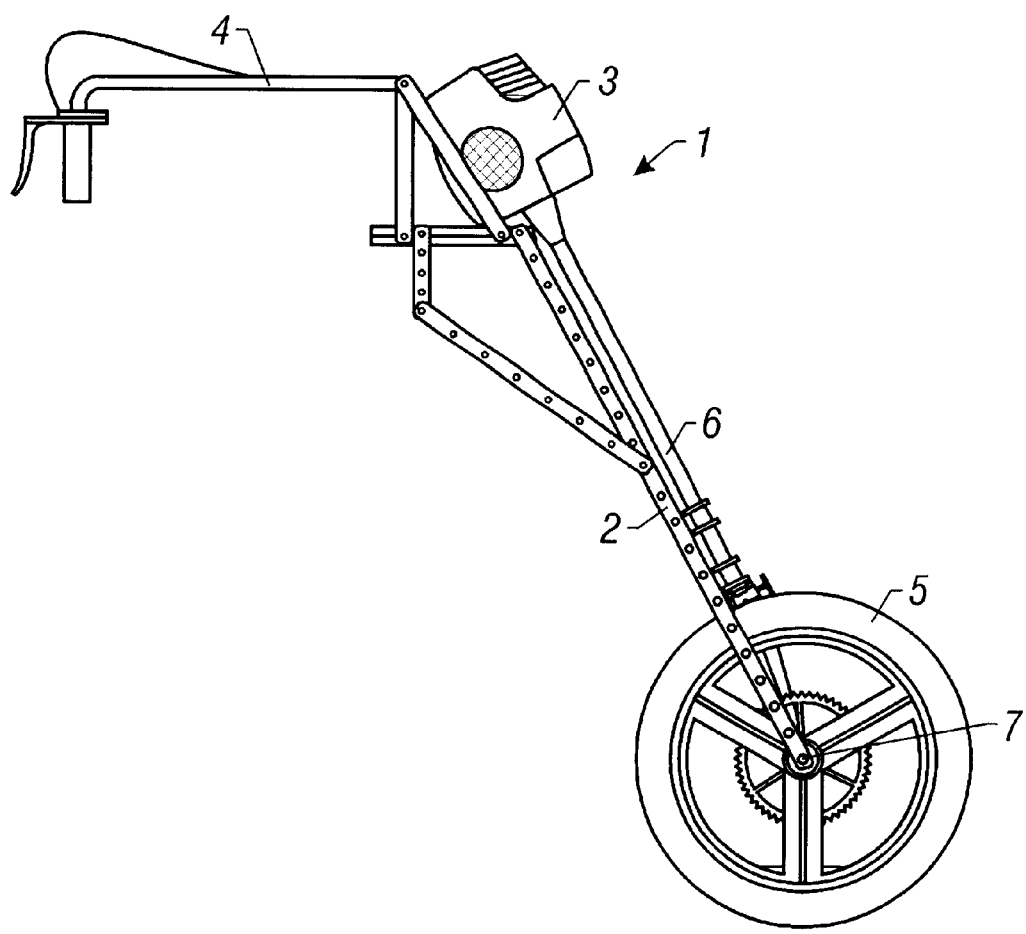
FIG. 13 shows a side view of an alternative embodiment of the invention.
Figure 14:
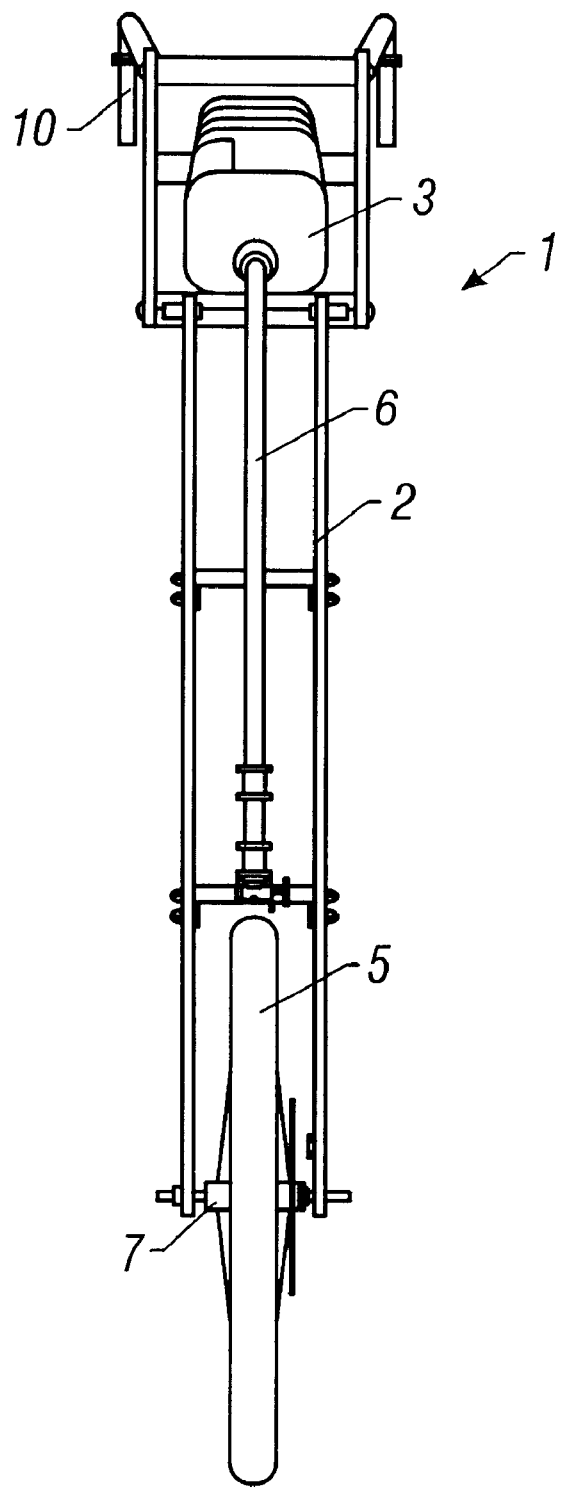
FIG. 14 shows a rear view of an alternative embodiment of the invention.
Figure 15:
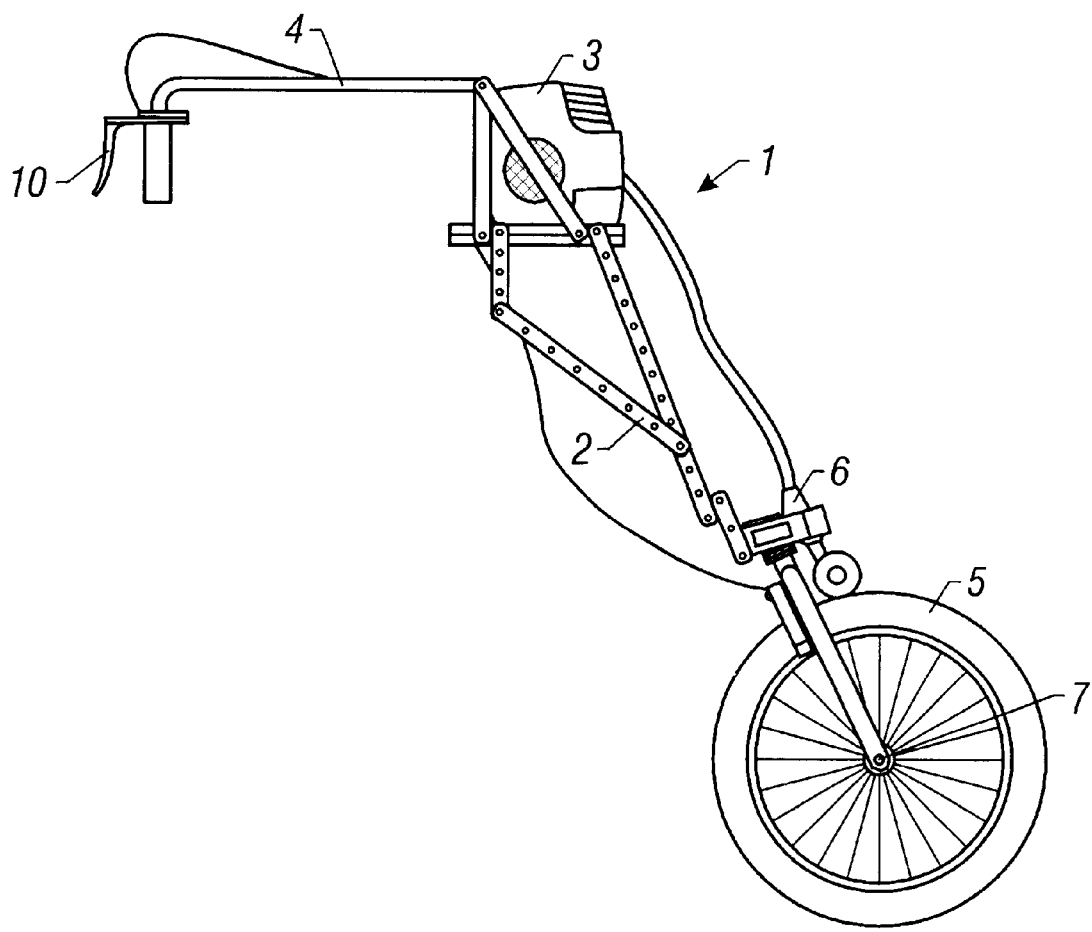
FIG. 15 shows a side view of an alternative embodiment of the invention.
Figure 16:
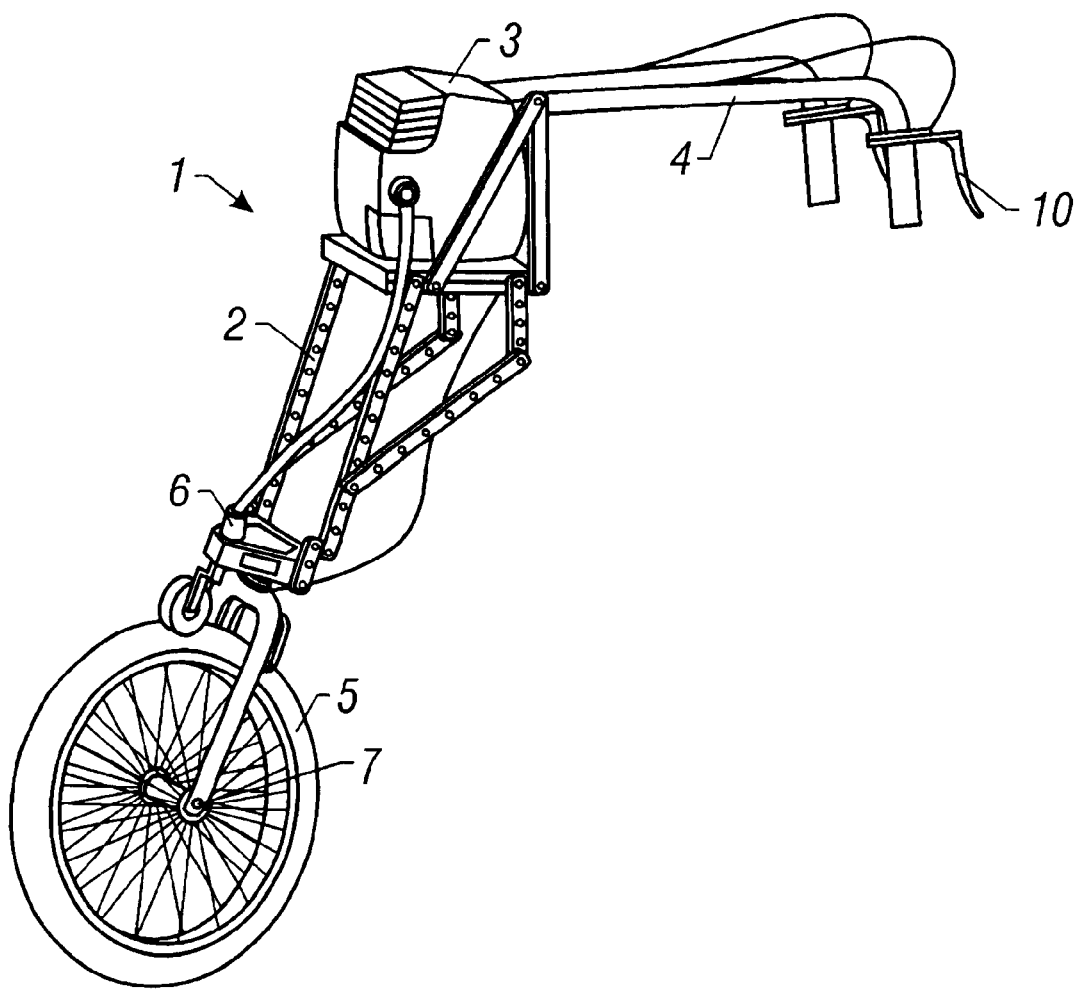
FIG. 16 shows a perspective view of an alternative embodiment of the invention.
Figure 17:
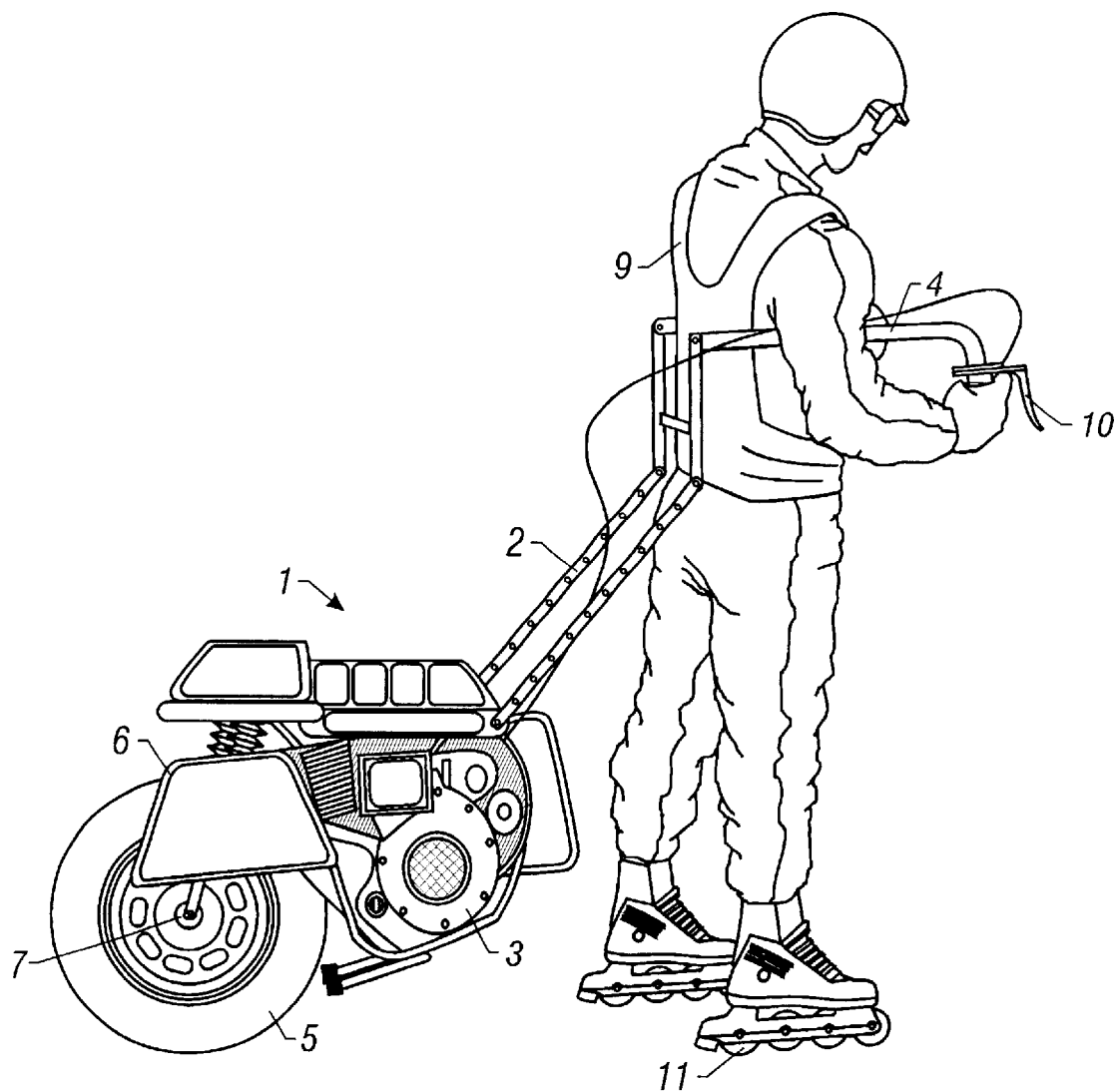
FIG. 17 shows a side view of an alternative embodiment of the invention.
Figure 18:
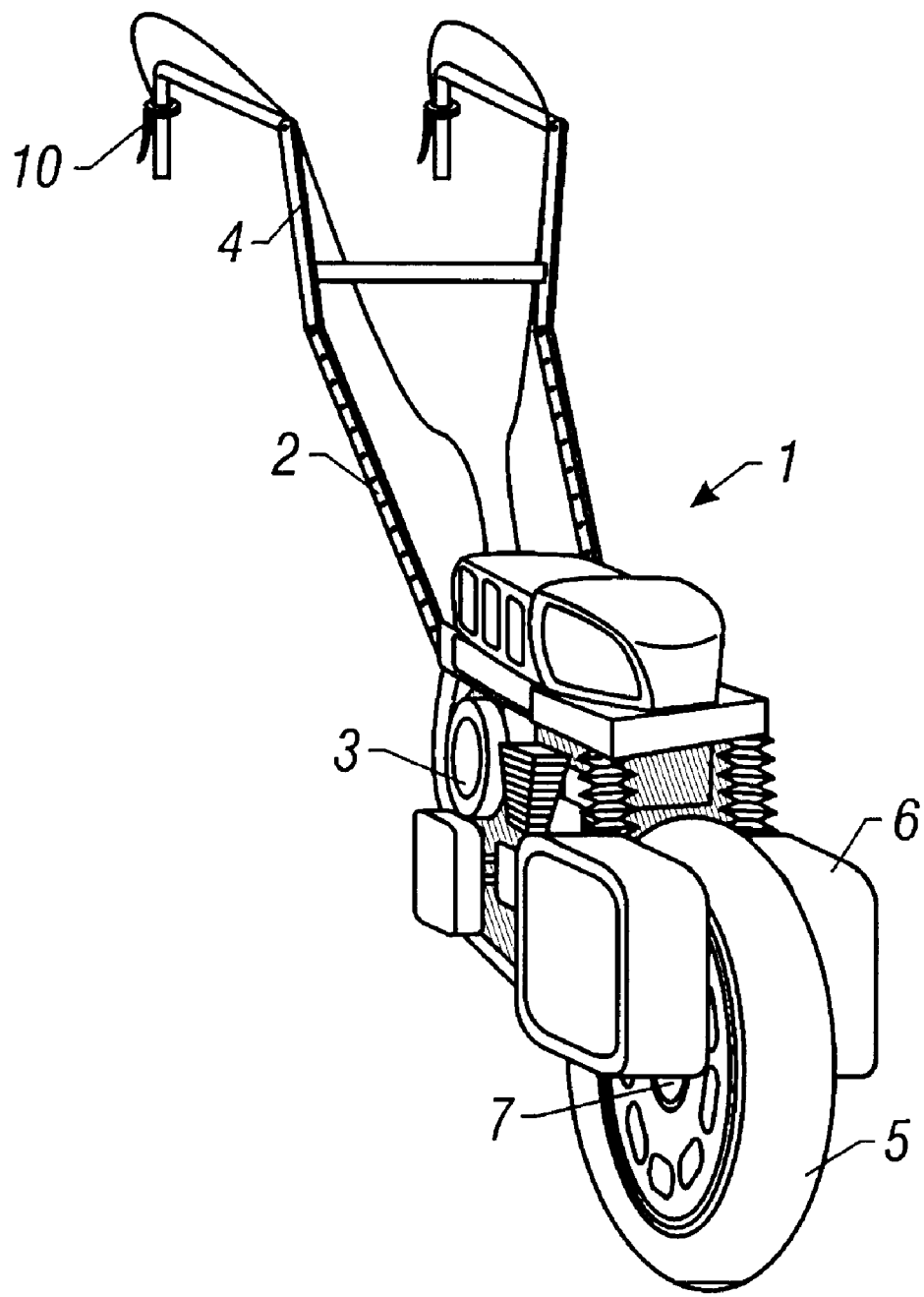
FIG. 18 shows a perspective view of an alternative embodiment of the invention.

Also, FIGS. 8–19 demonstrate several different embodiments of the present invention. As shown in FIGS. 8–12 and FIGS. 15–16, the propulsion device 1 comprises a drive train 6 that further comprises a flexible drive leading from the motor 3 to the traction device 5. In the preferred embodiment, the traction device 5 is a tire. However, the traction device may be any device described herein. The drive train 6 depicted in the embodiment shown in FIGS. 13–14 illustrates that the present invention can comprise a drive shaft. Finally, the embodiment depicted in FIGS. 17–19 demonstrates that the propulsion device 1 is adaptable to a direct drive train.

Additionally, FIG. 12 illustrates that the interface between the user and the propulsion device 1 can comprise hinging or rotating relationship such that the user may disengage the propulsion device 1 from the terrain. As shown in the preferred embodiment, the user can move the handlebars 4 downward. This movement will pivot the propulsion device 1 about the pivot point at the usser's hinging or rotating interface to the propulsion device 1 and cause the traction device 5 to disengage from contact with the terrain. This motion allows the user to skate, slide, or similarly move across the terrain without the aid of the propulsion device 1. If the user moves the handlebars 4 upward, the propulsion device 1 will pivot and reengage the terrain to aid in propelling the user. As an example, FIG. 12 shows that the handle bar assembly 4 can be disposed on a first side of the user 12, such as the front side 15. The remainder of the frame 2, motor 3, and traction device 5 can be disposed on a second side of the user, such as the back side 16, that may be distal from the first side. As shown, the pivoting can, in general, occur vertically between the user's shoulders 14 and the user's waist 13 and horizontally in-line with the user or toward the side of the user that is distal from the handlebars, such as the back side.

Moreover, the propulsion device 1 can be equipped with a motor 3 capable of propelling a plurality of users. Though the first user remains situated in the propulsion device 1 as depicted in FIGS. 8–12 and FIG. 17, at least one additional user can be pulled by a linking connector, preferably a rope, attached to the frame 2 such that the propulsion generated by the propulsion device 1 will also tow each additional user. In the alternative, the propulsion device 1 could also push additional users by placing each additional user in front of the user engaged in the propulsion device 1. In one embodiment, the handlebars 4 could be lengthened such that the additional users being pushed by the propulsion device 1 could grasp the handlebars 4 to benefit from the thrust created by the propulsion device 1. Alternatively, the entire frame 2 could be widened to allow additional users to be positioned adjacent to one another in a side-by-side configuration. This embodiment allows each user to be secured to the propulsion device 1 by a plurality of straps 9. This wider configuration may require a more coordinated effort to effectuate steering of the propulsion device 1.

Figure 19:
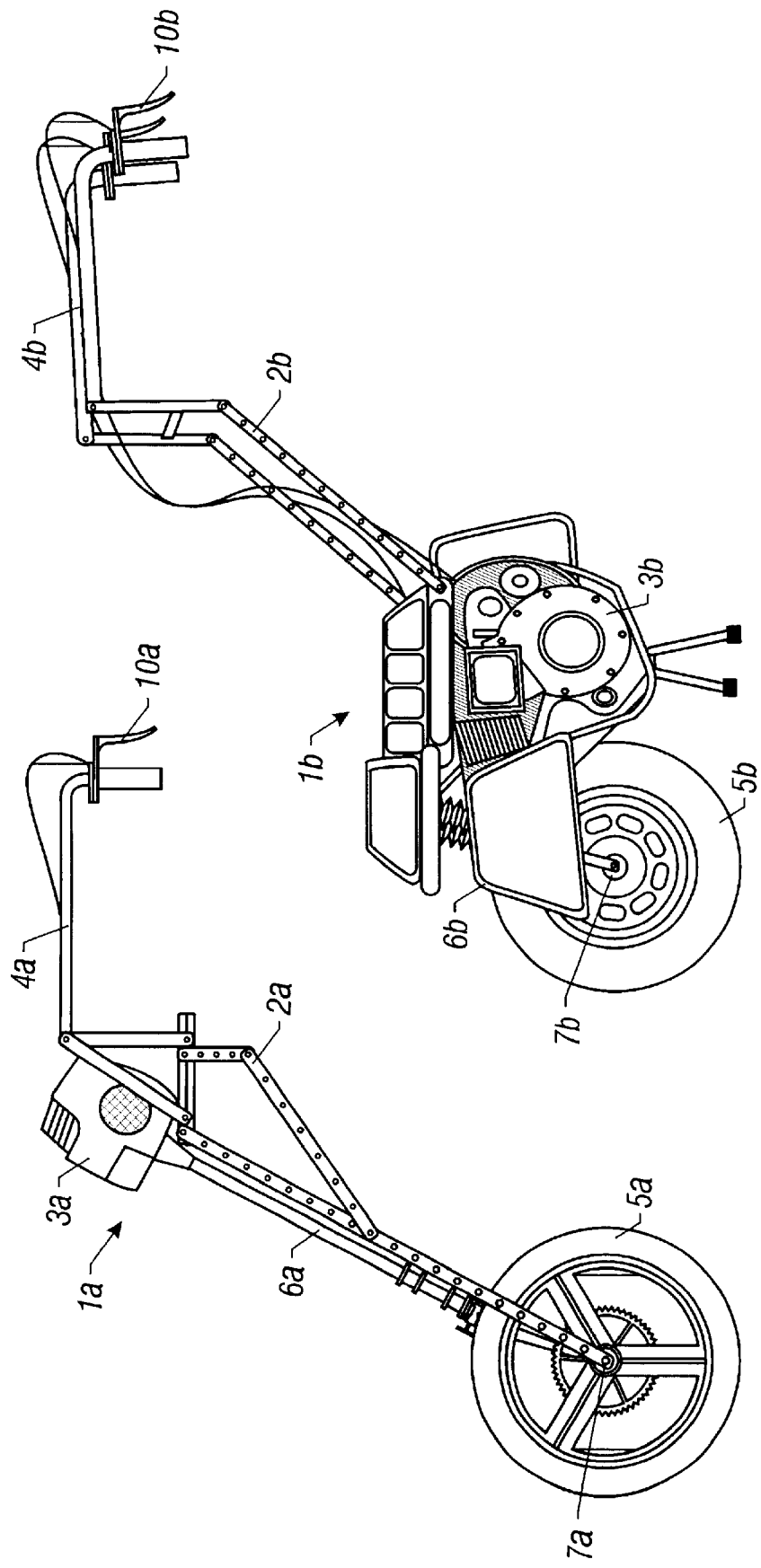
FIG. 19 shows a perspective view of two alternative embodiments of the present invention.

Of note, FIG. 19 shows a perspective view of two alternative embodiments of the present invention. Propulsion device 1a and propulsion device 1b as shown in a side-by-side arrangement such that the comparable features of each alternative embodiment may be compared. As shown, propulsion device 1a and 1b comprise frames 2a and 2b respectively, motors 3a and 3b respectively, handle bar assembly 4a and 4b respectively, and traction devices 5a and 5b respectively. As previously discussed, the frames 2a and 2b may be made of metal, composite, plastic, or other structurally strong material. Additionally, similar longitudinal axis 7a and 7b are shown on propulsion devices 1a and 1b respectively. Of note, this figure shows the differences in drive train 6a and 6b respectively. Drive train 6a comprises a shaft assembly while drive train 6b benefits from an alternative drive train that may direct drive or similar means known to those skilled in the art. Accordingly, propulsion device 1a and/or 1b may be embodied in various configurations known to those skilled in the art without varying beyond the scope and spirit of the invention as claimed and disclosed herein.

Furthermore, a proportionally sized propulsion device 1 could be used to accommodate and propel at least one action figure, figurine, doll, or related toy as the user. All of the variations for the propulsion device 1 described herein are equally applicable to any toy comprising at least one friction reducing device. In the preferred embodiment, a small, electric, direct current motor 5 receiving power from a small battery attached or enclosed within the propulsion device 1 provides the power and translates the propulsion device 1 and each toy connected, affixed, attached, or secured to the propulsion device 1. Moreover, the propulsion device 1 preferably further comprises a steering mechanism that allows the propulsion device 1 to change directions. In the preferred embodiment, the propulsion device 1 further comprises a small servomotor capable of rotating the traction device 5 such that the direction of travel of the propulsion device 1 is altered. In the alternative, if the propulsion device 1 comprises a plurality of traction devices 5, the inclusion of a small friction mechanism on at least one of the traction devices 5 could effectuate any desired change in direction. These options are by no means exhaustive and many variations will be evident to those skilled in the art.

Additionally, the propulsion device 1, when used in conjunction with at least one action figure, figurine,,doll, or related toy, may further comprise a remote-control device capable of actuating the motor, brake, steering mechanism, or similar features included in the propulsion device 1. In the preferred embodiment, this remote-control device is equipped to send radio signals to a receiving unit attached or incorporated into the propulsion device 1, but any means known to those skilled in the art could be used. For example, the remote-control device could communicate via infrared signals to the receiving unit. In the alternative, the remote-control device may be physically connected to the propulsion device 1 by at least one wire, fiber-optic cord, or similar transmission medium. In an effort to further reduce the complexity and cost of the propulsion device 1 in this configuration, the connection to the propulsion device may comprise at least one simple connector such as at least one rope, string, cord, or similar connector wherein the user may selectively pull each connector to alter the motor 3 and/or the direction of the propulsion device 1. This embodiment could forego the associated costs of the steering mechanism but may require the user to physically interact with the propulsion device 1. Finally, another alternative for using the propulsion device 1 in this configuration may comprise an audio receiver device attached or incorporated within the propulsion device 1 capable of receiving, translating, and acting upon audio signals from the user. Though the user could use a hand held device capable of emitting distinct sounds or tones which, when received by the receiving device, could change the direction, speed, or similar activities of the propulsion device 1, the preferred method of use in this alternative may comprise an audio receiver capable of receiving, translating, and acting upon simple voice commands from the user.

Having described the invention above, various modifications of the techniques, procedures, material and equipment will be apparent to those in the art. It is intended that all such variations within the scope and spirit of the appended claims be embraced thereby.

We claim:

1. A propulsion device for a user traversing a terrain, comprising:
   a) a frame;
   b) a motor attached to the frame;
   c) a drive train coupled to the motor;
   d) a traction device coupled to the drive train;
   e) a handle bar assembly attached to or formed in the frame;
   f) at least one control coupled to the handle bar assembly;
   g) at least one engagement means connected to the frame and capable of engaging the user, the engagement means being adapted to allow the user to pivot the handle bar assembly from a first position to a second position when the handle bar assembly is adapted to be disposed on a first side of the user to cause the traction device to disengage the terrain on a second side of the user and wherein the pivot occurs in-line with the user or toward the second side of the user that is distal from the handle bat assembly; and the motor is positioned at an upper end of the frame and adapted to be disposed adjacent the second side of the user.

2. The propulsion device of claim 1, wherein the first side of the user is defined as a front side of the user and the second side of the user is defined as a backside of the user.

3. The propulsion device of claim 1, wherein rotation of the handle bar assembly from the first position to the second position comprises a downward rotation to cause the traction device to move upward.

4. The propulsion device of claim 1, further comprising at least one friction reducing means adapted to be connected to or worn by the user.

5. The propulsion device of claim 1, further comprising a plurality of traction devices coupled to the device train.

6. The propulsion device of claim 1, wherein at least one control is capable of activating, fluctuating, or terminating the motor.

7. The propulsion device of claim 1, further comprising a brake throttle and a brake capable of stopping the propulsion device and wherein the controls comprise an actuator.

8. The propulsion device of claim 1, wherein the frame is adapted to be pivoted between the user's shoulders and the user's waist.

9. A propulsion device for a user traversing a terrain, comprising:
   a) a frame;
   b) a motor attached to the frame;
   c) a drive train coupled to the motor;
   d) a traction device coupled to the drive train and disposed toward a back side of the user;
   e) a handle bar assembly attached to or formed in the frame and disposed toward a front side of the user;
   f) at least one control coupled to the handle bar assembly;
   g) at least one engagement means connected to the frame and capable of engaging the user, the engagement means having a pivot adapted to be disposed in-line with the user or toward the back side of the user to allow the user to pivot the handle bar assembly from a first position to a second position to disengage the traction device from the terrain; and the motor is positioned at an upper end of the frame and adapted to be disposed adjacent the back side of the user.

* * * * *